United States Patent [19]
Suzuki

[11] Patent Number: 6,026,400
[45] Date of Patent: Feb. 15, 2000

[54] INFORMATION PROCESSORS WHICH PROVIDE ADVICE INFORMATION, AND RECORDING MEDIUMS

[75] Inventor: Hideo Suzuki, Tokyo, Japan

[73] Assignee: Casio Computer Co., Ltd., Tokyo, Japan

[21] Appl. No.: 09/022,331

[22] Filed: Feb. 11, 1998

[30] Foreign Application Priority Data

Feb. 19, 1997 [JP] Japan ..................................... 9-35211
Apr. 2, 1997 [JP] Japan ................................. 9-842020

[51] Int. Cl.<sup>7</sup> ..................................................... G06F 17/00
[52] U.S. Cl. .......................... 707/6; 707/4; 707/5; 707/7
[58] Field of Search ............................... 707/1–206, 530; 455/158.4; 705/36; 709/204–219

[56] References Cited

U.S. PATENT DOCUMENTS

| | | | |
|---|---|---|---|
| 4,334,270 | 6/1982 | Towers ...................................... | 705/36 |
| 5,239,700 | 8/1993 | Guenther et al. .................... | 455/158.4 |
| 5,675,815 | 10/1997 | Yamauchi et al. ...................... | 707/530 |
| 5,787,414 | 7/1998 | Miike et al. ................................ | 707/2 |
| 5,799,151 | 8/1998 | Hoffer .................................... | 709/204 |
| 5,852,819 | 12/1998 | Beller .................................... | 707/101 |

FOREIGN PATENT DOCUMENTS

| | | |
|---|---|---|
| 0287310 A2 | 10/1988 | European Pat. Off. . |
| 0454453 A2 | 10/1991 | European Pat. Off. . |
| 3939860 A1 | 6/1990 | Germany . |
| WO 91/09368 | 6/1991 | WIPO . |
| WO 95/29451 | 11/1995 | WIPO . |

OTHER PUBLICATIONS

Schreiber, F.A. et al: "Dynamic User Profiles and Flexible Queries in Office Document Retrieval Systems", Decision Support Systems, vol. 5, No. 1, Jan. 1, 1989, pp. 13–28.

Database Inspec, Institute of Electrical Engineers, Stevenage, GB. & Myaeng, S.H.: "Integration of User Profiles: Models and Experiments in Information Retrieval", Information Processing and Management, vol. 26, No. 6, pp. 719–738, 1990.

A Priori Analysis of Natural Language Queries, I, Spiegler, Information Processing and Management, vol. 24, No. 6, 1988, pp. 619, 631.

Precision and Recall of Ranking Information–Filtering Systems, Journal of Intelligent Information Systems: Artificial Intelligence and Database Technologies, Shih–Hao Li, vol. 7 No. 3, Nov. 1996, pp. 287–306.

An Information System Based on Distributed Objects, Michael Caplinger, Proceedings of the Object Oriented Programming Systems, Languages and Applications Conference, Orlando, Florida, USA, Oct. 1987, vol. 22, No. 12, Dec. 1987.

(List continued on next page.)

*Primary Examiner*—Thomas G. Black
*Assistant Examiner*—David Yink Jung
*Attorney, Agent, or Firm*—Frishauf, Holtz, Goodman, Langer & Chick, P.C.

[57] ABSTRACT

An agent computer block 16 analyzes and classifies the meaning of a request for advice on an individual's action, on the basis of voice recognition character data inputted by an input/output computer block 15, and requests a personal computer 2 to start up an information retrieval application program involving the request for advice on the individual's action. When the agent computer block 16 receives from the started-up application extraction items set in an information data base of interest, the agent computer block 16 extracts from the voice recognition character data a keyword corresponding to any one of the extraction condition items or a keyword specifiable on the basis of the individual's preference data in an information file stored in a storage device 17, and transfers to the personal computer 2 an instruction to retrieve information which meets the information extraction conditions to thereby causes the personal computer 2 to retrieve required information and provide the retrieved information back for the agent computer block 16.

20 Claims, 12 Drawing Sheets

OTHER PUBLICATIONS

Patent Abstracts of Japan, vol. 014, No. 274 (P–1061) Jun. 13, 1990 & JP 02 079200 A (Hitachi Ltd.), Mar. 19, 1990.

Patent Abstracts of Japan, vol. 096, No. 012, Dec. 26, 1996 & JP 08 221697 A (Nec. Corp.), Aug. 30, 1996.

Patent Abstracts of Japan, vol. 097, No. 001, Jan. 31, 1997, & JP 08 235495 A (Aqueous Res:KK), Sep. 13, 1996.

Patent Abstracts of Japan, vol. 017, No. 532 (P–1619), Sep. 24, 1993 & JP 05 143649 A (NEC Software Ltd.), Jun. 11, 1993.

FIG.3

TRAVEL DATABASE

| AREA | TIME (BEST SEASON) | TERM | PERIPHERAL FACILITIES | CANDIDATE PLACE |
|---|---|---|---|---|
|  |  |  |  |  |
|  |  |  |  |  |
|  |  |  |  |  |

INFORMATION PROCESSORS WHICH PROVIDE ADVICE INFORMATION, AND RECORDING MEDIUMS

BACKGROUND OF THE INVENTION

The present invention relates to information processors which retrieve appropriate information in reply to an operator's request and provides the operator with the information.

Lately, as businesses become more information oriented, personal computers have become vital tools. It is commonplace to see one computer per employee. Also, within the companies, the various information contained in each individual's personal computer is compiled and then used jointly. Thus, the use of a LAN (Local Area Network) as the computer network is also becoming rapidly more and more widespread as a means to improve work efficiency.

Furthermore, along with the spread of computer networks, communication between employees via the E-mail has greatly increased through LAN. In comparison to the company's LAN, in-home personal computers equipped with communication function or portable information terminals (hereinafter referred to as PDAs (Personal Digital Assistants) carried by the owner are usable to access the company's LAN through the public circuit network enabling them to send and receive E-mails.

In addition, information service networks are also rapidly gaining popularity in which one can use a computer's communication network such as an Internet to access an information service center via a personal computer and a PDA to obtain desired information or reserve tickets, etc.

As the structure of computer communication networks or information service networks composed of a LAN become diversified and increasingly hierarchical, the steps which the user (or owner) must take to access the desired information tends to become increasingly complex. This, however, has become an obstacle to the novice user at computer operation, as opposed to the seasoned user when the novice user uses the network.

Therefore, as it is the novice users who possess or use much of the computers and PDAs, development of access software to allow them to access desired information easily via the network has increased. In order to further upgrade this access software, access software with an agent function have recently been developed and put to the practice.

When this agent function equipped software is introduced into the personal computer and PDA to access the network, it will also be introduced into the server's side of the network which provides the needed information. In response to a simple command by the user, the terminal agent automatically accesses the server within the computer network cooperate with the server's agent to start transaction to reduce the user's burden, for example, by collecting information according to the user's job or interests and by acting on the user's behalf handle incoming transactions, in accessing the network and to act on the user's behalf to automatically retrieve and exchange necessary data. However, as stated below, to make the agent usage workable, this function is still insufficient.

Namely, the above-mentioned automatic data retrieval and exchange proxy function is to access the network, retrieve and collect needed information based on the previously entered user's information such as work content (job plan, etc.), and communicants addresses and other previously established retrieval condition items. If the retrieval condition items inputted are incomplete, the data retrieving process would stop, the result would be obscure and may not even be what the user requested. Therefore, merely retrieving data based on previously established information would decrease the changes of offering the user beneficial information, and thus the agent function's usefulness would decline.

SUMMARY OF THE INVENTION

It is an object of the present invention to provide an information processor which if information necessary for the retrieval is insufficient, automatically retrieves the insufficient information, advises the user of retrieval items, also retrieves information suitable for the user's preference on the basis of the user's preset preference information to facilitate narrowing down information to be retrieved, thereby utilizing the agent function of access software effectively.

In order to achieve the above object, according to one aspect of the present invention, there is provided an information processor responsive to a request for advice on an individual's action for retrieving information which meets the contents of the request and providing the information for the individual, comprising:

input means for inputting the contents of the request to the information processor;

extraction item setting means in which a plurality of extraction items corresponding to the contents of the request is set;

keyword specifying means for analyzing the contents of the request inputted by the input means, and for specifying a keyword corresponding to any one of the plurality of extraction items set in the extraction item setting means on the basis of the result of the analysis;

insufficient information determining means for determining on the basis of the keyword specified by keyword specifying means whether the inputted contents of the request are insufficient for information retrieval corresponding to the request is insufficient; and insufficient information requesting means responsive to the insufficient information determining that the inputted contents of the request for the information retrieval for requesting that data which supplements the inputted contents of the request should be inputted to the information processor.

According to the composition of the information processor according to the present invention, if information (a keyword) necessary for retrieval of second information is insufficient, the former information is automatically retrieved and the user is advised of the retrieved information. Therefore, the user is relieved from the beginning from useless anxiety about what request the user himself or herself should make.

In order to achieve the above object, according to another aspect of the present invention, there is provided an information processor responsive to a request for advice on an individual's action for retrieving information which meets the contents of the request and providing the information for the individual, comprising:

input means for inputting the contents of the request to the information processor;

extraction item setting means in which a plurality of extraction items corresponding to the contents of the request is set;

preference information storing means in which the individual s preference information is stored;

keyword specifying means for analyzing the contents of the request inputted by the input means, and for specifying a keyword corresponding to any one of the plurality of extraction items set in the extraction item setting means on the basis of the result of the analysis;

item extracting means for extracting at least one of the extraction items set in the extraction item setting means in consideration of the individual's preference information stored in the preference information storing means on the basis of the keyword specified by the keyword specifying means; and information retrieving means for retrieving from a predetermined data base information which meets the inputted contents of the request for advice on the individual's action on the basis of the at least one of the extraction items extracted by the extracting means.

According to the just-mentioned composition of the information processor according to the present invention, in response to the user inputting a request for advice on the user's action, data for the advice is retrieved on the basis of not only the contents of the inputted request but also the user's preference information stored beforehand. Therefore, information which meets the user's preference is obtained rapidly.

In order to achieve the above object, according to a third aspect of the invention, there is provided an information processor responsive to a request for advice on an individual's action for retrieving information which meets the contents of the request and for providing the information for the individual, comprising:

input means for inputting the contents of the request to the information processor;

action information storage means in which records of the individual's past actions are stored;

extraction item setting means in which a plurality of extraction items for the contents of the request for advice on the individual's action is set;

analysis means for analyzing the contents of the request inputted by the input means; and extraction means for extracting the tendency of the individual's actions in consideration of records of the individual's past actions stored in the action information storage means when at least one of the extraction items set in the extraction item setting means is extracted on the basis of the result of the analysis, for narrowing the extraction items down on the basis of the tendency of the individual's actions and the result of the analysis, and for outputting the narrowed-down extraction items.

According to the composition of the just-mentioned information processor according to the present invention, best advice information is provided for the user on the basis of the user's tendency which are based on records of the user's past actions.

BRIEF DESCRIPTION OF THE DRAWINGS

FIG. 3 illustrates the set contents of a travel data base stored as an information data base in a storage device of FIG. 1;

DETAILED DESCRIPTION OF THE PREFERRED EMBODIMENTS

First Embodiment

Figure 1:
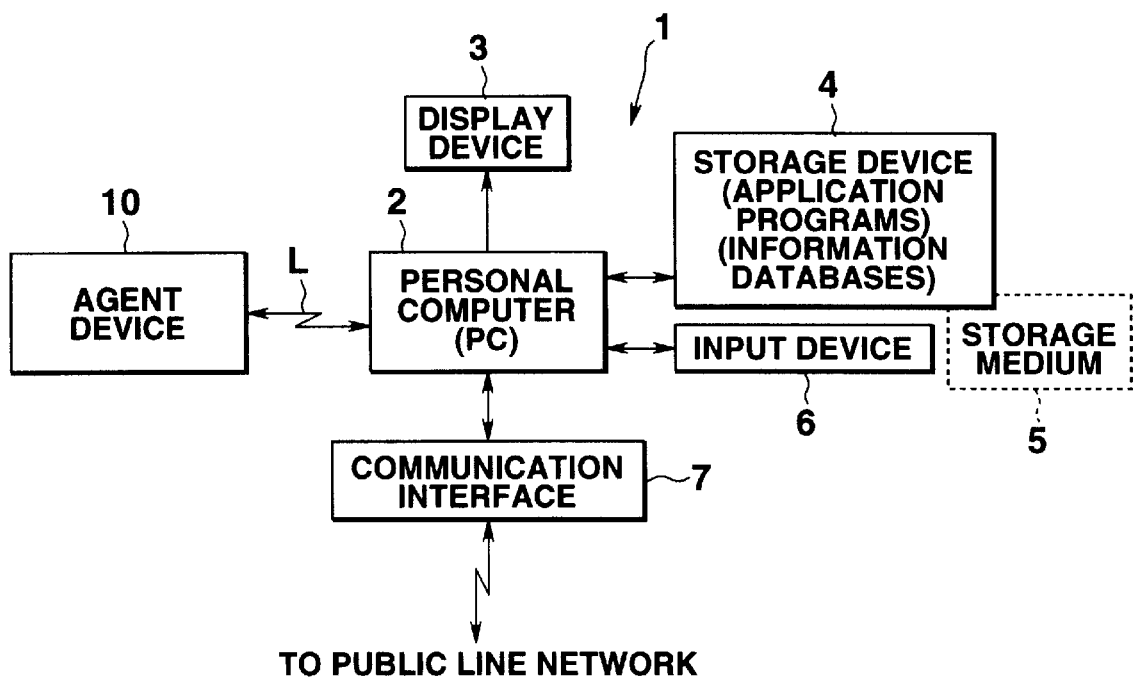
FIG. 1 illustrates a whole composition of a computer system which includes an agent device as a first embodiment of an information processor according to the present invention.

FIGS. 1–6 shows a computer system which includes a first embodiment of an information processor according to the present invention. FIG. 1 illustrates a whole composition of the information processor, in which a processing computer 1 is connected via a data line L to an agent device 10. The processing computer 1 is composed of a personal computer 2, a display device 3, a storage device 4, a storage medium 5, an input device 6, and a communication interface (PC) 7.

The personal computer 2 stores an application program, selected from among various application programs contained in the storage device 4 which also contains a system program, in a program storage area in a built-in RAM (Random Access Memory) (not shown), stores in the RAM data/respective instructions entered from the input device 6, performs various processing operations on the basis of the input data/instructions in accordance with the application program stored in the RAM, stores the result of the processing operations at appropriate addresses in the storage device 6 specified by the input device 3, and displays the result of the processing operations on the display device.

The personal computer 2 retrieves various information in an information data base of the storage device 4 in response to a request for starting up an application program for information retrieval, a request for transfer of extraction condition items, a request for reporting the number of extraction conditions given by a keyword, a narrow-down instruction given by a keyword, or an instruction to display detailed information on candidates to be selected, received via the data line L from the agent device 10, and transfers data on the result of the processing operations to the agent device 10.

The personal computer 2 accesses via the communication interface 7 and a public line network to an external processing computer (not shown), and requests the processing computer to retrieve information in response to various requests for information retrieval received via the data line L from the agent device 10, and receives the result of the information retrieval from the external processing computer and transfers the result of the information retrieval to the agent device 10.

The display unit 3 is composed of a CRT (Cathode Ray Tube) or liquid crystal display panel which displays data received from the personal computer 2 and which displays the requests and retrieval information to be transferred in various processing operations corresponding to the information retrieval requests performed by the personal computer 2.

The storage device 4 includes a storage medium S which is composed of a magnetic or optical recording medium or a semiconductor memory provided fixedly or removably therein which contains/stores the system program, various corresponding application programs, communication program, information data bases, and data processed by the respective processing programs.

Program/data such as are contained/stored in the storage medium 5 may be received from other devices via the public line network and the communication interface 7. Alternatively, such data may be received via the public circuit network and a communication line from a storage device which includes a storage medium provided on another device which contains/stores programs/data.

The input device 6 is provided with cursor keys, numeral input keys and various function keys which enter respective signals generated when depressed into the personal computer 2. The communication interface 7 is connected via the public line network to the external processing computer in accordance with a request for communication received from the personal computer 2, sends/receives information to/from the external processing computer and transfers received information to the personal computer 2.

Figure 2:
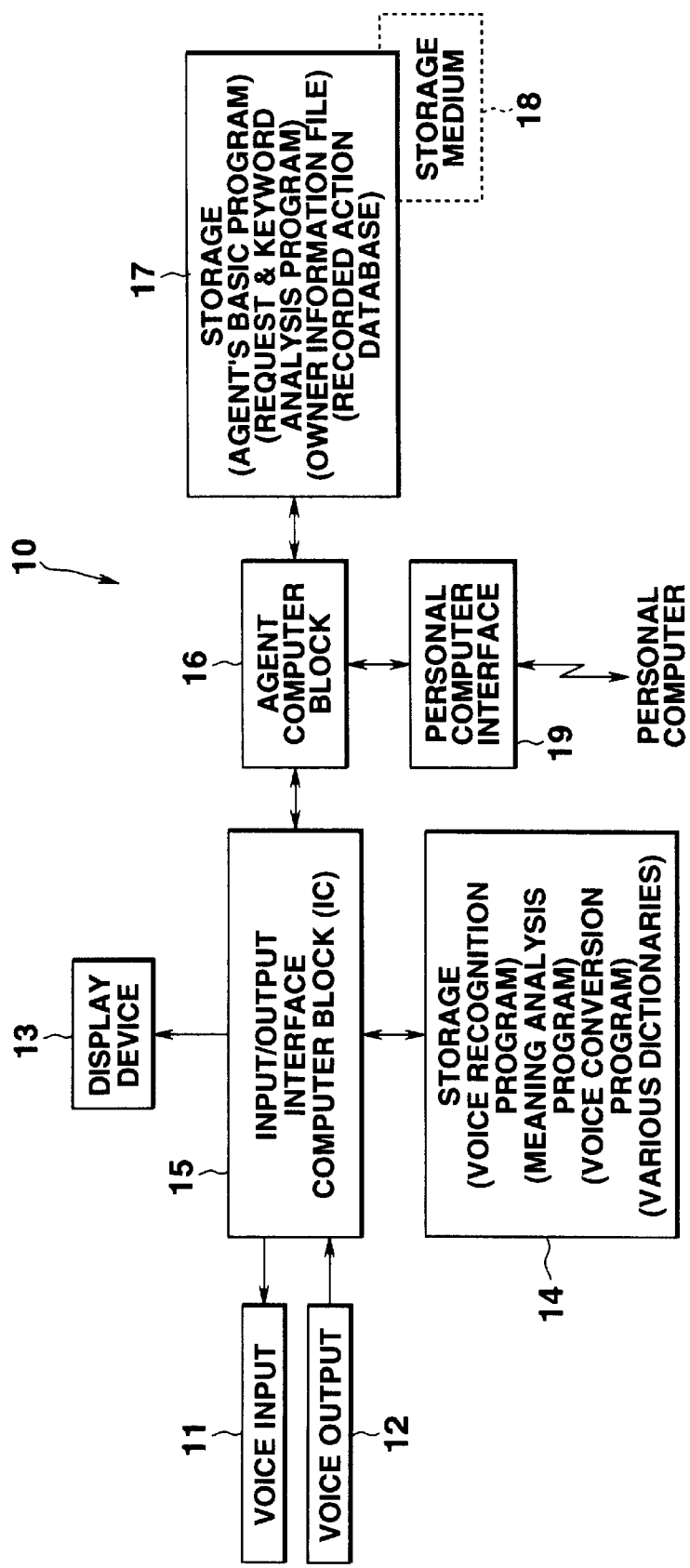
FIG. 2 is a block diagram of an agent device of the information processor of FIG. 1.

Referring to FIG. 2, the agent device 10 of FIG. 1 will be described in more detail. In FIG. 2, the agent device 10 is composed mainly of an input/output interface computer block (IC) 15 and an agent computer block 16. The input/output computer block 15 is connected to a voice output device 11, a voice input device 12, a display device 13 and a storage device 14. The agent computer block 16 is connected to a storage device 17, a storage medium 18, and a personal computer interface 19.

The voice input device 12 converts an inputted user's voice instruction to voice instruction data. The input/output interface computer block 15 recognizes the contents of the voice instruction data in accordance with a voice recognition program stored in the storage device 14, analyzes the classification and meaning of the contents of a request for information retrieval on the basis of the recognized voice instruction data in accordance with a meaning analysis program stored in the storage device 14, and feeds the result of the analysis to the agent computer block 16.

When the input/output interface computer block 15 receives information on candidates retrieved by the agent computer block 16 on the basis of the classification and meaning of the contents of the request fed to the agent computer block 16, the input/output interface computer block 15 converts the information on candidates to speech data in accordance with a speech conversion program stored in the storage device 14, and outputs corresponding candidate information audibly via the voice output device 11. The voice output device performs a D/A conversion process on the speech data received from the input/output interface computer block 15 and outputs the resulting data in the form of a voice message from a built-in speaker.

The voice input device 12 performs an A/D conversion process on a user's voice command inputted via a built-in microphone therein and feeds the resulting voice data to the input/output interface computer block 15.

The display device 13 is composed of a CRT or a liquid crystal display panel which displays data received from the input/output interface computer block 15 and also displays voice commands/retrieved information received in the respective processes corresponding to the information retrieval requests executed by the agent computer block 16.

The storage device 14 contains the voice recognition program, meaning analysis program, voice conversion program and various dictionary data used in the meaning analysis, which are executed by the input/output interface computer block 15.

The agent computer block 16 executes various action advising processes on the basis of an agent's basic program stored in the storage device 17. More particularly, the agent computer block 16 analyzes and classifies the contents of a request for advice on the user's action on the basis of the voice recognition character data received from the input/output interface computer block 15, and feeds to the personal computer 2 a request for starting up an information retrieval application program involved in the action advising request. When the agent computer block 16 then receives from the personal computer 2 an extraction condition item set in the information data base to be retrieved from the started-up application, it extracts from the voice recognition character data a keyword corresponding to the extraction condition item or a keyword specifiable on the basis of the owner's preference data in an owner's information file stored in the storage device 17, transfers to the personal computer 2 an instruction to retrieve information which meets an information extraction condition based on the keyword, and requests the personal computer 2 to report the result of the retrieval of the information.

When the agent computer 16 receives the retrieved information from the personal computer 2, creates a list of candidates from the retrieved information and transfers it to the input/output interface computer block 15, causes the display device 13 to display the list of candidates, causes the voice output device 11 to output a voice message which urges the user to select retrieval items which are to be narrowed down. When the owner inputs the selected retrieved items in the form of a voice instruction into the voice input device 12, the agent computer block 16 analyzes the contents of the voice instruction, determines whether there is any request for another list to be retrieved or whether there are any candidates to be selected, and displays the list of candidates and the details of the respective selected candidates in the input/output interface computer block 15 in accordance with the result of the determination.

The storage device 17 includes a storage medium 18 which is composed of a magnetic or optical recording medium or a semiconductor memory, provided fixedly or removably therein which contains/stores an agent's basic program and various corresponding programs such as request and keyword analysis programs, which the agent computer block 16 executes, an owner information file which contains/stores the owner's preference information, a recorded action data base which has recorded the owner's actions, and other data.

The programs/data stored in the storage medium 18 may be received from another device connected via a public line network by a personal computer interface 19. Alternatively, the program/data may be obtained via the public network and a communication line from a storage device, such as is designated by 18, which includes a storage medium provided on another device.

Figure 5:
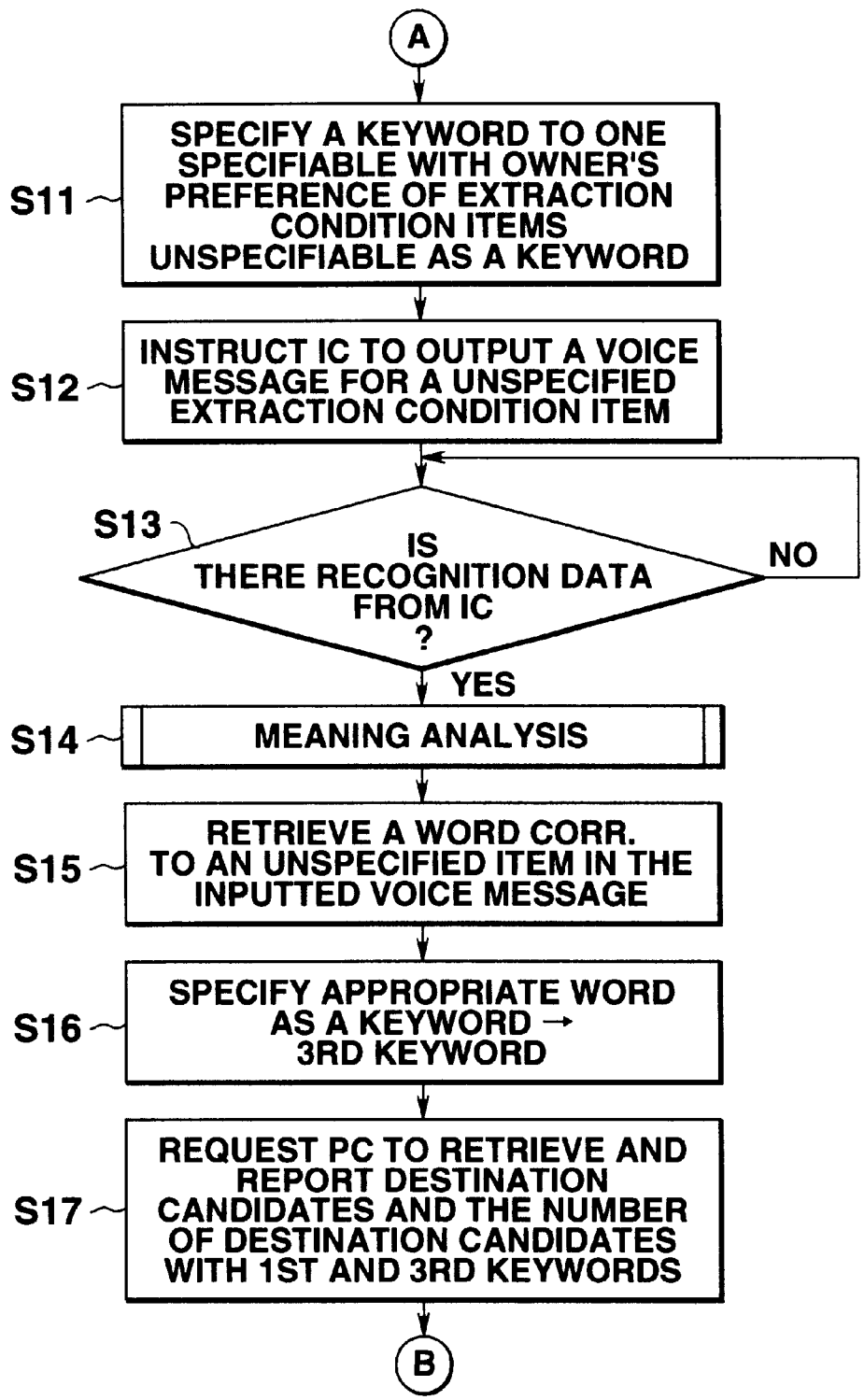
FIG. 5 is a flow chart to be connected to the flow chart of FIG. 4.
Figure 6:
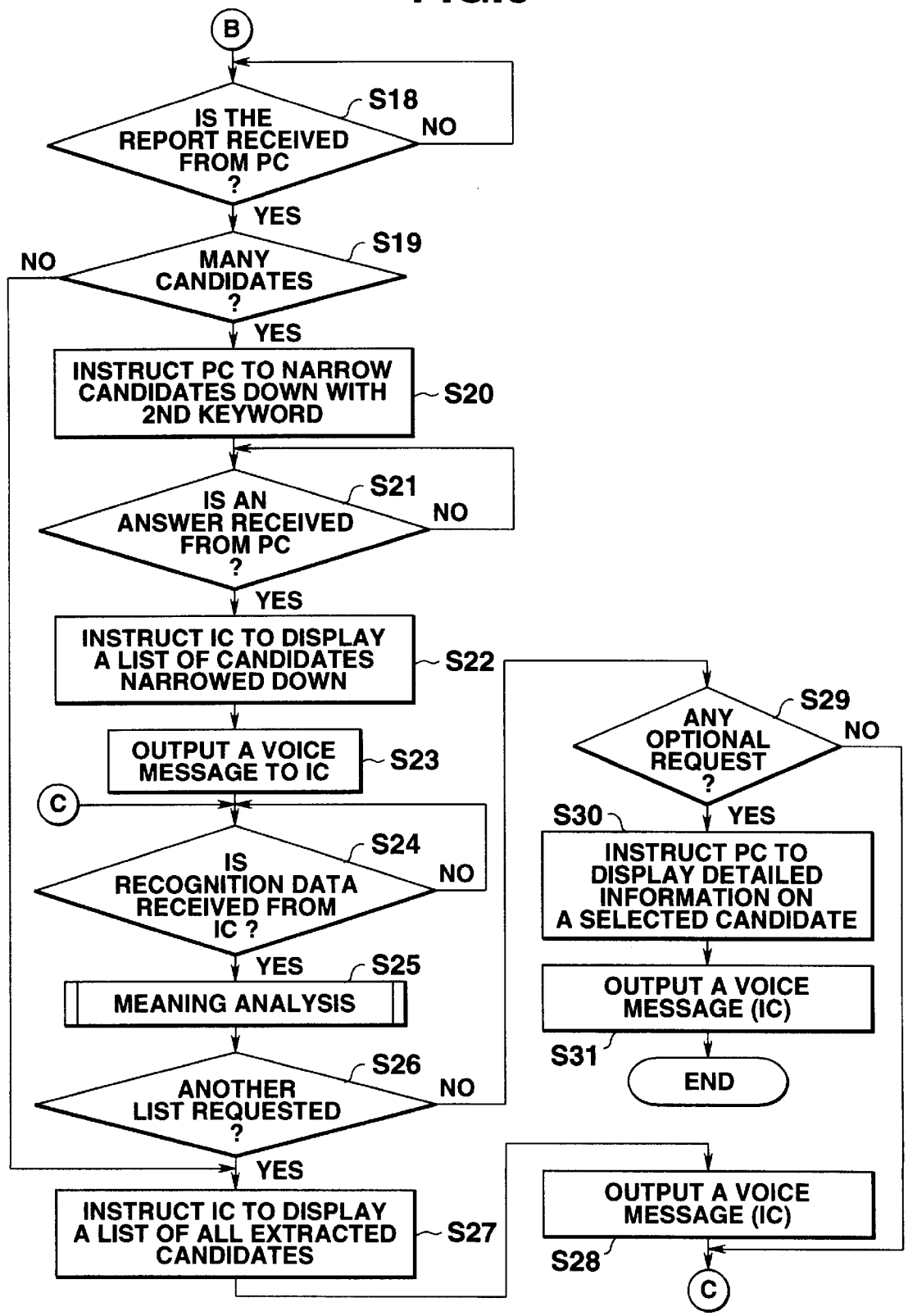
FIG. 6 is a flow chart to be connected to the flow chart of FIG. 5.

An action advising process performed by the agent computer block 16 will be described next with reference to a flow chart of FIGS. 4–6. This process involves providing the owner of various advice information about his or her action, especially his or her travel, in reply to the owner's requests for such various advice information.

In order to answer those requests, the information data base contained the storage device 4 of the personal computer 2 includes a travel data base of FIG. 3, which contains a plurality of destination "areas" as items. For each destination "area", the travel data base of FIG. 3 contains information on a "time" indicative of the best season for travel in that area, a "term" of the travel, "peripheral facilities" about that area, a "term" and "place candidates" in that area. The travel data base is retrieved by the personal computer 2 when the agent computer block 16 answers a request for advice on an action in the travel.

Figure 4:
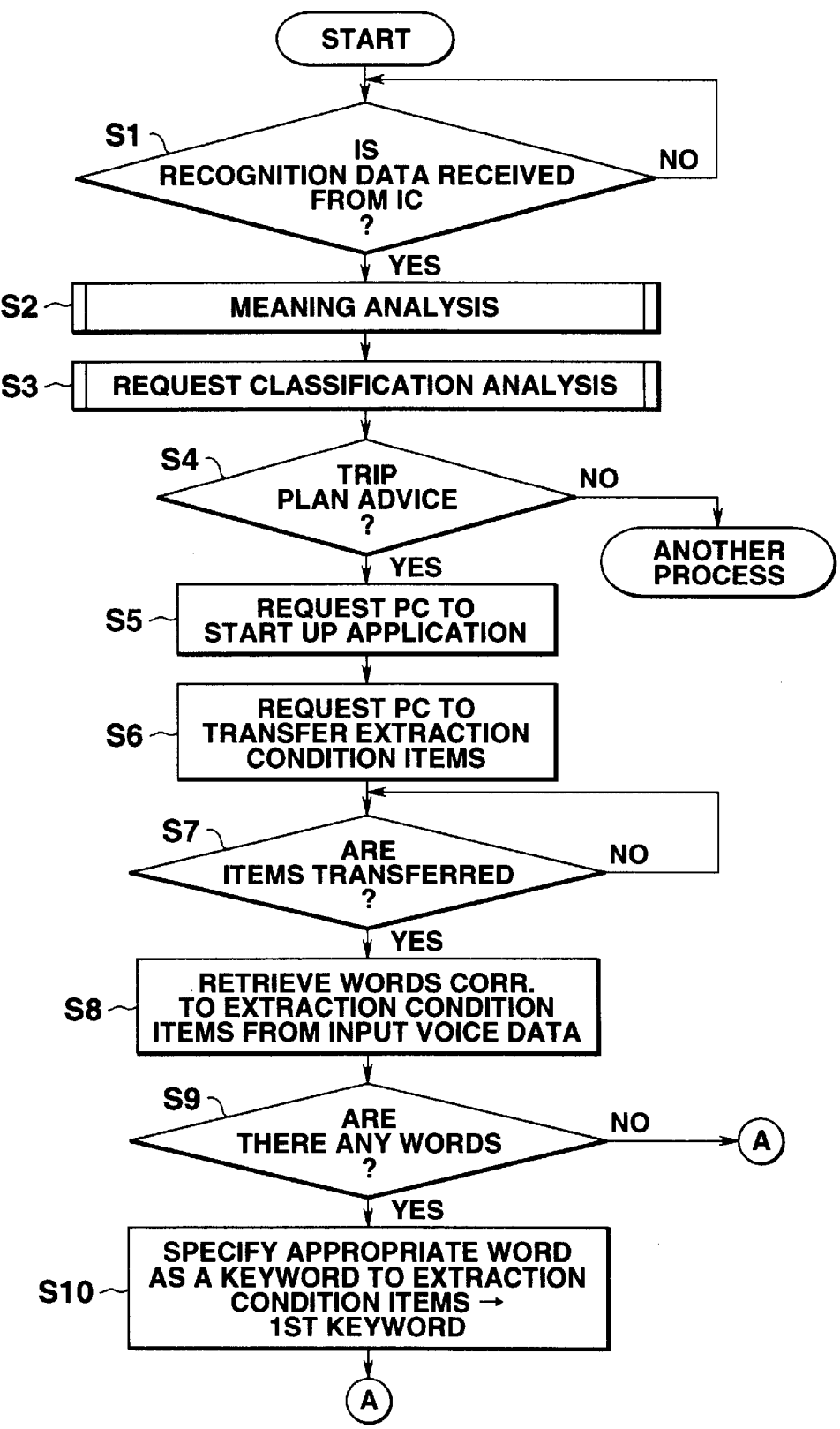
FIG. 4 is a flow chart of a part of an action advice giving process executed by an agent computer block of FIG. 2.

In FIG. 4, the agent computer block 16 first waits for an input of voice recognition character string data based on a voice instruction from the input/output computer block 15 (step S1). That is, when the owner inputs his or her voice instruction to the voice input device 12, it is recognized by the input/output interface computer block 15. Thus, the agent computer block 16 determines that corresponding voice recognition character data has been inputted.

In response to the voice recognition character data being inputted at step S1, the agent computer block 16 analyzes the meaning of the character string data, classifies the owner's request (steps S2, S3), and determines whether the owner's request is "for advice on a travel plan" of the requests for advice on the owner's actions or on the basis of the result of the analysis and classification (step S4). The contents of the owner's request is classifiable from a word as a key to the character string data.

For example, when the owner inputs a voice message such as "Now, where shall we go for this summer vacation?", the agent computer block 16 analyzes the voice character string data and classifies the contents of the owner's request contained in the voice character string data, displays the voice character string on the display unit 13 of the input/output interface computer block 15 to cause the owner to confirm the contents of his or her input voice message or instruction. In response to the owner's confirmation in voice, when the agent computer block 16 checks the contents of the owner's voice confirmation, and determines that it involves not a "request for advice on a travel plan", but a request for advice for a different action, the agent computer block 16 shifts its processing to another step corresponding to the request for advice on the different action. When the agent computer block 16 determines that the contents of the owner's voice confirmation involves a "request for advice on a travel plan", it transfers to the personal computer 2 via the personal computer interface 19 a request for starting up a travel information providing application which is an application program for executing information retrieval necessary for the request for advice for a travel plan and a request for starting up an application program for searching the travel data base of FIG. 3 (step S5).

More specifically, the agent computer block 16 recognizes that the request involves advice for a travel plan or advice for the owner's action in the nearest future on the basis of keywords "where" and "go" of the voice recognition character string data "Now, where shall we go for this summer vacation?" analyzed at step S2. In addition, from the keyword "for this summer vacation", the agent computer block recognizes that the request involves advice for a travel plan and not the request for advice on the owner's action in the nearest future. Thus, the agent computer block 16 requests the personal computer 2 to start up a travel information providing application.

Subsequently, the agent computer 16 transfers a request for transfer of extraction condition items involving the request for advice on the travel plan to the personal computer 2 via the personal computer interface 19 (step S6).

In response to the request transferred by the agent computer block 16 for starting up the application program for searching the travel data base, the personal computer 2 starts up an application program for searching the travel data base stored in the storage device 4. In response to the request for transfer of the extraction condition items transferred by the agent computer block 16, the personal computer 2 transfers to the agent computer block 16 as the extraction condition items data on information items (area, time, term, peripheral facilities, destination candidate) set in the travel data base of FIG. 3 stored in the storage device 4.

When the agent computer block 16 confirms that the extraction condition items have been transferred from the personal computer 2 in response to the request for transfer of the extraction condition items (step S7), the agent computer block 16 retrieves a word corresponding to the extraction condition items from among the voice recognition character string data "Now, where shall we go for this summer vacation?" analyzed from the inputted voice message in the meaning analysis process at step S2 (step S8). The agent computer block 16 determines whether there is a word corresponding to any one of the extraction condition items from the result of the retrieval of the word (step S9). If there are no words corresponding to the extraction condition items, it shifts its processing to step S11. If the agent computer block determines that there is a word corresponding to any one of the extraction condition items, it specifies the corresponding word as a first keyword to the extraction condition item (step S10).

In the retrieval of the extraction condition items, the keyword "this summer vacation" is determined to be a keyword to the "time for travel", so that the "summer vacation" is specified as a first keyword.

When it is determined that there are no words corresponding to the extraction condition items, or after the first keyword is specified, an item, specifiable from the owner's preference data, of the extraction condition items which cannot be specified as respective keywords to the voice recognition character string data is specified as a second keyword at step S11.

The owner's preference data, for example, relate to which of the sea, mountains, hot springs, resorts, play spots (amusement grounds, pastures, museums, art galleries, movie theaters, etc.) the owner likes, which sports the owner likes, what interest the owner has. Those data should be stored beforehand in the owner's information file in the storage device 17. In the first embodiment, if an element, for example, "the owner likes mountains" is contained in the owner's preference data, a keyword to the extraction condition item "travel area" is specified as "mountains". If an element "the owner likes field athletics" is contained in the owner's preference data, a keyword to the extraction condition item "facilities" is specified as "facilities for playing" as a second keyword.

If there are still unspecified extraction condition items even after the first and second keywords are specified, the agent computer block 16 instructs the input/output interface computer block 15 to output a voice message expressing a request for specifying those unspecified extraction condition items (for example, "Please specify a travel term.") (step S12).

In response to this message, the input/output interface computer block 15 outputs a message request "Please specify the travel term "via the voice output device 11 for the owner. When the owner inputs a voice message "I'll stay for about two nights" in response to the message request, the input/output interface computer block 15 recognizes that voice message and feeds corresponding voice recognition character data to the agent computer block 16.

Confirming the message "I'll stay for about two nights" received from the input/output interface computer block 15 (step S13), the agent computer block 16 analyzes the meaning of the message (step S14), retrieves a keyword corresponding to the extraction condition items in the input voice character string (step S15), and specifies as a third keyword a keyword corresponding to the retrieved extraction condition item (step S16). In the retrieval of this extraction condition items, the words "stay for two nights" are determined as a keyword corresponding to the "travel term" and specified as the third keyword.

The agent computer block 16 transfers to the personal computer 2 a request for informing the owner of destination candidates and the number of destination candidates on the basis of the first keyword "summer vacation" specified at step S10 and the third keyword "stay for two stays" specified at step S16 (step S17). The personal computer 2 starts to retrieve required information in the travel data base of FIG. 3 in response to the request for informing the owner of the destination candidates and the number of destination candidates, and transfers to the agent computer block 16 the result of the retrieval of the destination candidates and the number of destination candidates extracted in the retrieving process. The personal computer 2 holds data on the destination candidates and the number of destination candidates extracted.

When the agent computer block 16 confirms the extracted destination candidates and the number of extracted destination candidates received from the personal computer 2 (step S18), it determines whether there are many extracted destination candidates (step S19). If so, the agent computer block 16 transfers to the personal computer 2 a request for narrowing the already extracted destination candidates down, using the second keyword "play facilities" specified at step S11 as the narrowing-down conditions (step S20). The personal computer 2 starts to narrow down the destination candidates extracted from the travel data base of FIG. 3 in response to the request for narrowing the destination candidates down, and transfers to the agent computer 16 the result of narrowing down the destination candidates (a narrowed-down list of destination candidates). The personal computer 2 holds data on the result of narrowing the destination candidates down.

When the agent computer block 16 confirms the result of narrowing down the destination candidates (a list of narrowed-down destination candidates) transferred from the personal computer 2 (step S21), it instructs the input/output interface computer block 15 to display the list on the display device 13 (step S22), and instructs the input/output interface computer block 15 to feed to the voice output device 11 a voice message "Destination candidates are listed in accordance with your instruction. Please watch the display screen. The owner's preference is considered. Please specify a destination candidate, if any, the details of which you desires to know.", "We have a list of more destination candidates. Please specify one of the destination candidates which you desire to know." (step S23).

If the owner inputs a voice message "Please list all destination candidates" is inputted to the voice input device 12 in reply to the voice message from the voice output device 11, the former message is recognized by the input/output interface computer block 15, and corresponding voice recognition data is fed to the agent computer block 16.

Thereafter, when the agent computer block 16 confirms the voice recognition data "Please list all the destination candidates" inputted by the input/output interface computer block 15 (step S24), it analyzes the meaning of the voice recognition data (step S25), and determines whether there is a request for another list (step S26). If so, or the agent computer block 16 determines that when the agent computer block 16 determines that there are not so many destination candidates at step S19, the agent computer block instructs the input/output interface computer block 15 to display all the extracted destination candidates in the form of a list on the display unit 13 (step S27), instructs the input/output interface computer 15 to feed from the voice output device 11 a voice message "All destination candidates are listed in accordance with your request. Please watch the display screen. If you desire to know the details of any particular destination candidates, please specify them." (step S28), and then returns to confirmation of the specified voice recognition data at step S24.

If there is a request for another list after the analysis of the meaning at step S26 and an optional selection instruction (for example, "Please tell me Nasu Heights") is entered (step S29), the agent computer block 16 instructs the personal computer 2 to call out detailed information on the appropriate destination candidate (step S30). In response to this calling, the personal computer 2 reads the detailed information on that destination candidate from the travel data base and transfers it to the agent computer block 16.

Receiving this information from the personal computer 2, the agent computer block 16 instructs the input/output interface computer block 15 to display that information on the display device 13 (step S31) and then terminates this processing. At this time, the agent computer block 16 instructs the input/output interface computer block 15 to output a voice message "Detailed information on the specified candidate (Nasu Heights) was read out. Please watch the display scree." from the voice output device 11.

As described above, the agent computer block 16 of the agent device 10 provided in the information processor of the first embodiment executes a respective process for giving the owner advice on his or her action on the basis of the agent's program stored in the storage device 17, analyzes and classifies the meaning and content, respectively, of the request for advice on the owner's action from the voice recognition character data inputted by the input/output interface computer block 15, and sends to the personal computer 2 a request for starting up an information retrieval application program involving the request for the appropriate advice. When the agent computer block 16 receives extraction condition items set in the information base to be searched from the started-up application, it extracts from the voice recognition character data a keyword corresponding to the extraction condition items or a keyword specifiable based on owner's preference data in the owner information file stored in the storage device 17, transfers an instruction to retrieve information which meets information extraction conditions based on the appropriate keyword, to the personal computer 2 to request same to retrieve the requested information and to send the agent computer block 6 the result of the retrieval of that information.

Receiving the result of the retrieval (retrieved information) from the personal computer 2, the agent computer 16 creates a list of destination candidates from the retrieved information, transfers the list to the input/output interface computer block 15, causes the display device 13 to display the list on its display screen, causes the voice output device 11 to output a voice message which urges the owner to select the retrieval items to be narrowed. When the owner inputs a voice instruction to select retrieval items to the voice input unit 12, the agent computer 16 analyzes the contents of the voice instruction, and determines whether there are any other lists or destination candidates to be selected, and causes the input/output interface computer block 15 to display a list of destination candidates and the details of the respective destination candidates to be selected, depending on the presences/absence of the request for other lists or the destination candidates to be selected.

Thus, information (keyword) required for information retrieval is insufficient in the agent device 10 of the first embodiment, the agent device 10 automatically retrieves that insufficient information (keyword) and advises the owner of that insufficient information. Thus, the owner is relieved from a useless anxiety as to what request should be made to the agent device 10.

When the owner inputs in voice a request for advice on his or her actions, the agent device 10 of the first embodiment retrieves data in consideration of not only the owner's direct request, but also owner's own preference information recorded beforehand in the owner information file in the storage device 17, so that data meeting the owner's preference is obtained immediately.

In the agent device 10, a first priority is given to providing the result of retrieval of information which the owner is expected to desire, and even if the result of the information retrieval involves an error, all the extracted data already retrieved and stored are outputted in response to an owner's voice instruction or request.

Since the agent device 10 automatically classifies advice on the owner's action on the basis of the owner's voice instruction, automatically requires the personal computer 2 to start up an information retrieval application program corresponding to the classification of the advice on the owner's action. Thus, when the owner inputs in voice a request for advice on the owner's action, the agent device 10 is capable of starting up an application program optimal to advice on an action which the owner desires, using a usual speech and not a speech which directly specifies an application program itself involving the advice on the owner's action.

Second Embodiment

The agent computer block 16 of the agent device 10 in the first embodiment retrieves a keyword to advice on the owner's action from the owner's speech request or instruction, instructs the personal computer 2 to retrieve information based on the keyword, narrows down extraction information on advice on the owner's action in which a first priority is given to the owner's preference on the basis of extraction condition items fed by the personal computer 2 and the owner's preference data stored beforehand to create and output a list of destination candidates.

In contrast, extraction information on another advice on the owner's action may be narrowed down on the basis of the owner's action data in the past, which will be described next with reference to FIG. 7 which involves a second embodiment of the invention. Since the personal computer 2 and the agent device 10 which constitute a second embodiment of the inventive information processor are the same in composition as those of the first embodiment of FIG. 1, and further illustration and description of the hardware composition thereof will be omitted.

Figure 7:
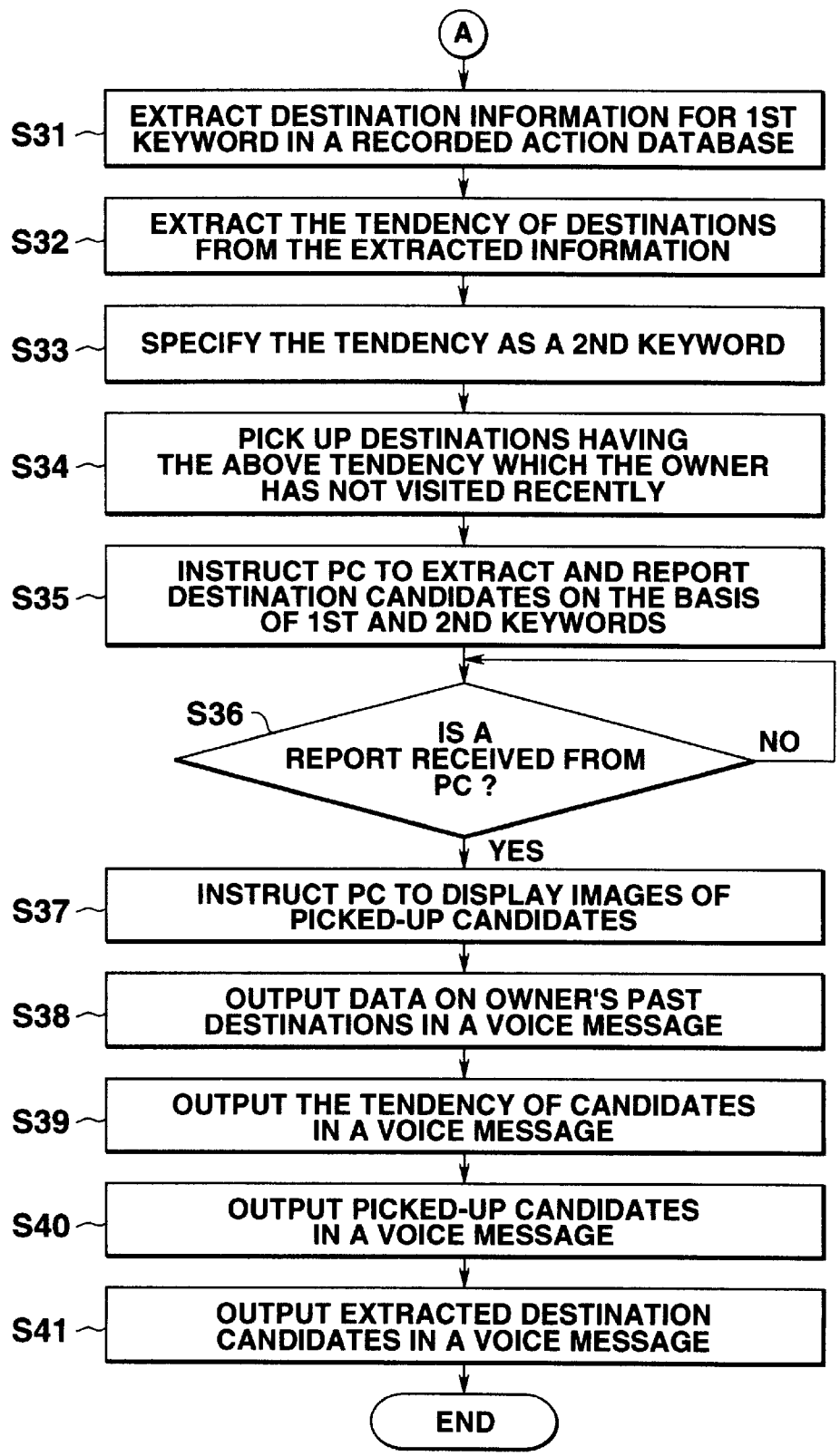
FIG. 7 is a flow chart of an action advice giving process executed by an agent computer block as a second embodiment of the inventive information processor.

Thus, when the agent computer block 16 performs an action advice giving process of FIG. 7, it refers to the owner's past recorded action data stored in the recorded action data base of the storage device 17, and narrows down extraction information on advice on the owner's action.

The flowchart of FIG. 7 of the action advice giving process continues to a symbol A appearing in each of steps S9 and S10 of the action advice giving process of FIG. 4 in the first embodiment. Thus, the description of the processing at steps S1–S10 of FIG. 4 will be omitted and the processing at and after step S31 of FIG. 7 will be described.

When the agent computer block 16 performs processing at steps S1–S10 of FIG. 4 to specify the first keyword "this summer vacation" as an extraction condition item from among the voice recognition character data inputted in voice by the owner, the agent computer block 16 shifts its processing to step S31 of FIG. 7, where it reads the owner's recorded travel data from among the owner's past recorded action data in the recorded action data base of the storage device 17, and extracts information on destinations in a travel term "summer" as the first keyword from among the recorded travel data (step S32).

The agent computer block 16 extracts data on the tendency of the destinations which the owner visits (for example, the destinations were mainly the sea or mountains) from the result of the extraction, specifies the tendency of the destinations as a second keyword (step S33), and picks up from the recorded action data base destination candidates which seem to meet the tendency of the destinations which the owner has not visited recently (for example, "Kamikochi") (step S34). The agent computer block 16 then instructs the personal computer 2 to extract destination candidates and inform the owner of those travel candidates on the basis of the first specified keyword (travel term "this summer") and the second keyword (the tendency of destinations (for example, the owner's destinations were mainly mountains.")(step S35).

The personal computer 2 starts to search the travel information data base on the basis of the instruction to extract destination candidates from the agent computer block 16 and a request for informing the agent computer block 16 of the result of the retrieval. The personal computer 2 then supplies the agent computer block 16 with the result of the retrieval. The personal computer 2 holds data on the result of the retrieval.

When the agent computer block 16 confirms the result of the retrieval from the personal computer 2 (step S36), it further instructs the personal computer 2 to display an image of the destination "Kamikochi" which the owner has not visited recently and which has been picked up at step S34 (step S37).

In response to this instruction, the personal computer 2 reads information on the image of the "Kamikochi" from the travel information data base and transfers the image information to the agent computer block 16.

Receiving this information, the agent computer block 16 instructs the input/output interface computer block 15 to display the image information on the display device 13. As a result, the image of the "Kamikochi" is displayed. The agent computer block 16 then picks up from the recorded action data base the destinations which the owner has visited for the last two years and the number of owner's stays from among information on the destinations for the travel term "summer" extracted at step S31, and instructs the input/ output interface computer block 15 to output the picked up data in the form of a voice message from the voice output device 11 (step S38).

In response to this instruction, the input/output interface computer block 15 outputs via the voice output device 11 a voice message "you stayed for two nights at Karuizawa and for one night at Nasu Heights, last year. You also stayed in Hakuba, Shinshu, for two nights the year before last".

Then, the agent computer block 16 instructs the input/output interface computer block 15 to output the second keyword (for example, "Heights") specified as the tendency of the destinations at step S33, in the form of a voice message from the voice output device 11 (step S39).

In response to this instruction, the input/output interface computer block 15 outputs from the voice output device 11 a voice message "You seem to visit heights more often than the sea in summer.".

In addition, the agent computer block 16 instructs the input/output interface computer block 15 to output information on the destination candidates (for example, "Kamikochi") picked up at step S34 and on the years in which the owner visited those destination candidates in the past, in the form of a voice message from the voice output device 11 (step S40).

In response to this instruction, the input/output interface computer block 15 outputs a voice message "How about visiting Kamikochi this year once in a while? You visited Kamikochi six years ago." from the voice output device 11.

The agent computer block 16 instructs the input/output interface computer block 15 to output the result of retrieval of the destination candidates, extracted on the basis of the first keyword "travel term; summer" and the second keyword "tendency of the destinations; the destinations were mainly mountains" received from the personal computer 2 at step S36, in the form of a voice message from the voice output device 11 (step S41) and then terminates this processing.

In response to the last-mentioned instruction, the input/output interface computer block 15 outputs a voice message "Other candidates are . . . " from the voice output device 11.

As described above, the agent computer block 16 of the second embodiment extracts from the voice recognition character data a keyword corresponding to extraction condition items or a keyword specifiable based on the owner's preference data in the owner information file stored in the storage device 17 in the action advice giving process. On the basis of this keyword, the extraction condition items are narrowed down in such a manner that the owner's past action record data stored in the recorded action data base in the storage device 17 are referred to, the tendency of the owner's actions are extracted, a list of destination candidates is created from the extraction condition items narrowed down on the basis of the tendency of the owner's action and the owner's instruction, and the list of destination candidates and the details of the destination candidates are displayed. Thus, the best destination candidates are narrowed down from the tendency of the owner's actions based on the owner's past action records. Thus, according to the agent function of the second embodiment, the best action advice information is provided to the owner from the tendency of the owner's actions based on the owner's past action records.

While in the first and second embodiments the travel advice giving process has been illustrated as an action advice giving process executed by the agent device 10, the agent device 10 is capable of executing a similar action advice giving process, using an information data base in which the above extraction items are set, in reply to a request for advice on another action, for example, based on schedule data or in the nearest future.

Third Embodiment

Figure 8:
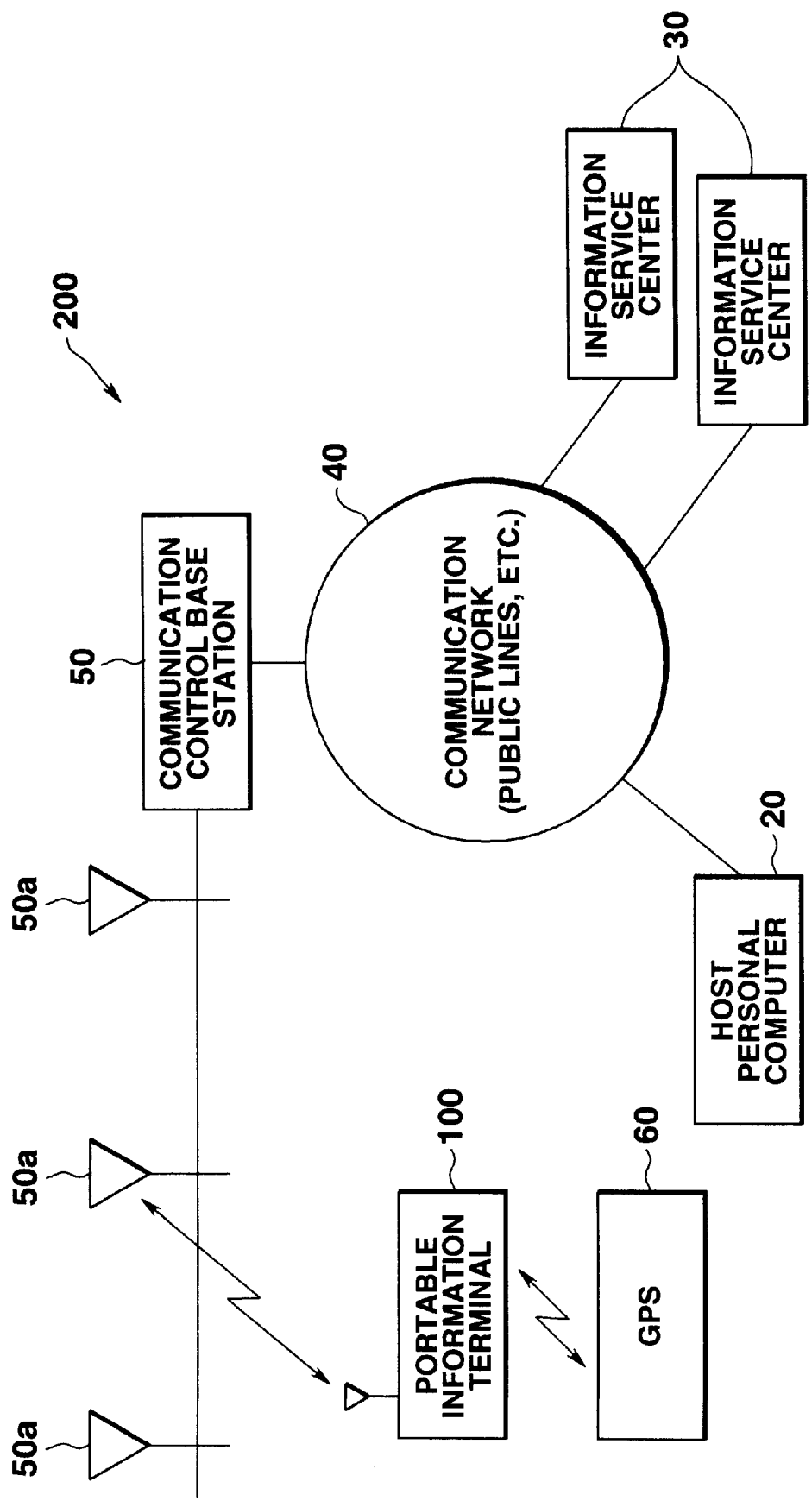
FIG. 8 illustrates an information processing system which includes a portable information terminal.

FIG. 8 shows an information processing system 200 which includes an inventive portable information terminal 100 as a third embodiment. The information processing system 200 of FIG. 8 is composed of the portable information terminal 100, a host personal computer 20, various information service centers 30, a communication network 40, and a GPS (Global Positioning System) 60.

Figure 9:
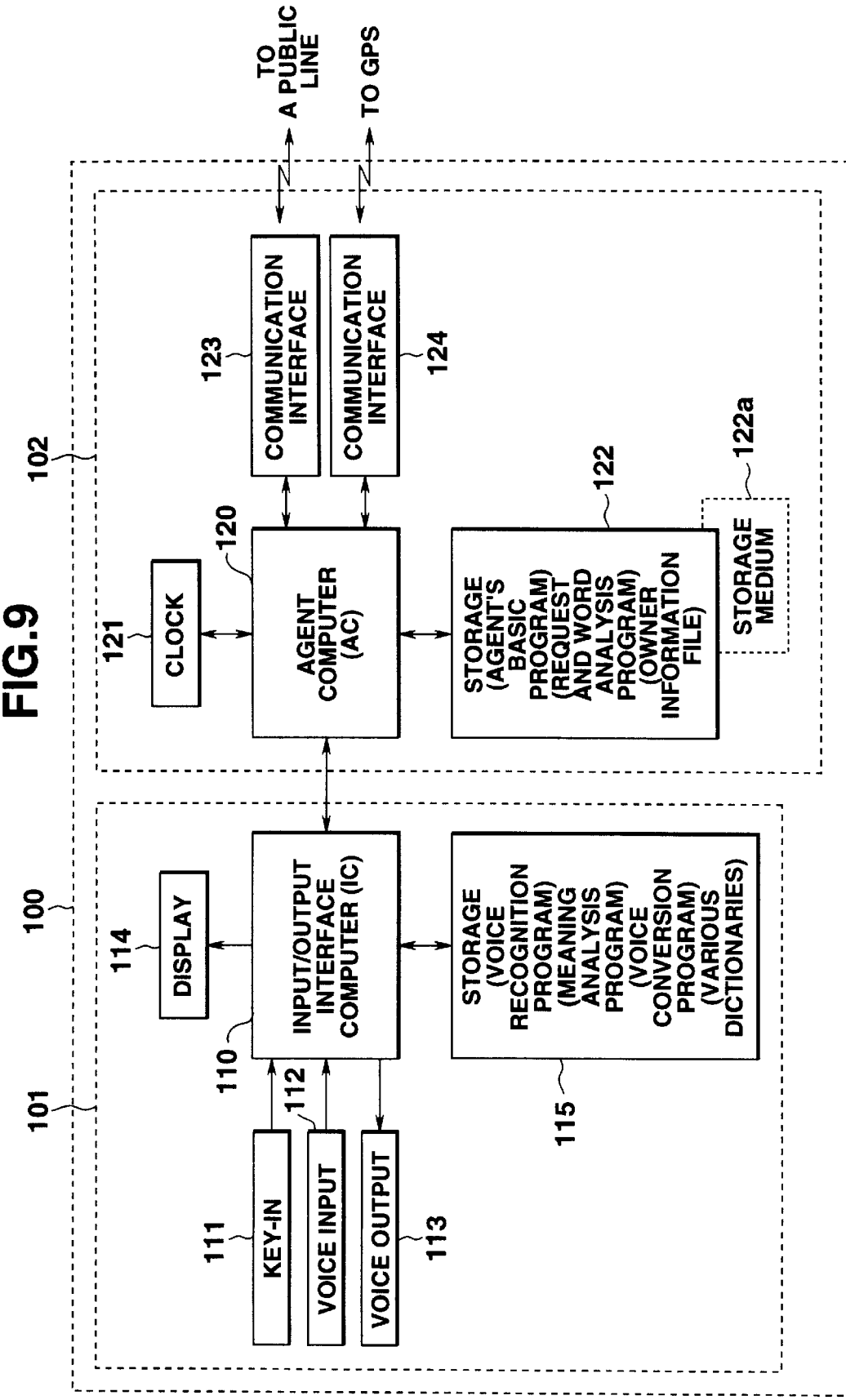
FIG. 9 is a block diagram of the portable information terminal.

Referring to FIG. 9, the portable information terminal 100 is composed of an input/output interface computer (IC) 110, a key-in device 111, a voice input device 112, a voice output device 113, a display device 114, an agent computer (AC) 120, a clock 121, a storage device 122 and communication interfaces 123, 124.

The host computer 20 is a personal computer, for example, provided in the user's (owner's) house, which computer is connected to the communication network 40 and has a function to communicate with the remote portable information terminal 100. The host computer 20 receives extraction conditions for retrieval information (the classification of a request for advice on the user's action, the current time, the user's current position, narrow-down conditions, etc.) specified by the user, and the user's extracting instruction from the portable information terminal 100, accesses an information data base in the host computer 20 or an information service center 30 via the commination network 40 to select/collect information which meets the extraction conditions.

At this time, the agent computer 120 of the portable information terminal 100 determines which information data base should be accessed on the basis of the classification of the request for advice on the user's action, and delivers information extraction conditions and an extraction instruction to the host computer 20.

The information service center 30 is composed of an information processor with a communication interface, and a storage device which contains data bases for various respective information, and provides a respective terminal which has accessed the information service center 30 via the communication network 40 with information retrieved in accordance with a request for information retrieval from the terminal. For example, when the portable information terminal 100 requests the host computer 20 to retrieve information in accordance with an inputted user's instruction and an information service center 30 is to be accessed for information retrieval (that is, when the agent computer 120 of the portable information terminal 100 determines that it should access the information service center 30 which has an information data base suitable for the classification of a request for advice on the user's action), the appropriate information service center 30 receives from the host personal computer 20 extraction conditions such as the classification of the information to be retrieved, current time, the user's current position, narrow-down conditions and an extraction instruction to access an information data base which meets the retrieval request conditions to collect required information, and sends the collected information via the communication network 40 to the host computer 20.

The communication network 40 is composed of a wide area communication network which includes public lines, communication control base station 50, base stations 50a, in charge of information communication between the portable information terminal 100, host computer 20, and information service center 30. The portable information terminal 100 is connected to the communication network 40 by radio communication between the portable information terminal 100 and a nearby one of base stations 50a scattered in respective areas. Communication information from the portable information terminal 100 is fed via the nearby base station 50a to the communication control base station 50, which then sends the communication information to the host computer 20 or a target information service center 30. Communication information from the host computer 20 or information service center 30 to the portable information terminal 100 is sent in a route reverse to that mentioned above.

The communication control base station 50 controls and manages communication by receiving via a base station 50a a signal received in the form of radio waves based on a communication protocol of a respective communication type from a communication interface 123 of the portable information terminal 100 which has a PHS function or a portable telephone function, and connecting a line to a communicant. The communication control base station 50 is capable of locating the current position of the user's terminal which has a PHS function or a portable telephone function on the base of a signal received from the terminal, and sending the communicant information on the located current position of the user.

The GPS 60 is provided on a mobile object such as a car and has a function of calculating the current position of the GPS 60 by receiving radio waves from a stationary satellite, and sending the information on its current calculated position to the user's portable information terminal 100 via a communication interface 124 by radio communication which uses infrared communication or radio waves.

While in the present embodiment the portable information terminal 100 receives information on the current position of the mobile object from the GPS device 60 mounted on the mobile object to detect the user's current position, the current position of the information terminal 100 may be known from information on its current position located by the communication control base station 50 (for example, using the position recording function of a PHS type), or it may be known from a GPS device built in the terminal 100.

FIG. 9 is a block diagram of the portable information terminal 100, which is composed mainly of an input/output interface computer block 101 and an agent computer block 102.

The input/output interface block 101 is provided with an input/output interface computer 110 connected to a key-in device 111, a voice input device 112, a voice output device 113, a display device 114 and a storage device 115. The agent computer block 102 is provided with an agent computer 120 connected to a clock 121, a storage device 122, a storage medium 122a, and communication interfaces 123, 124.

In the input/output interface computer block 101, the input/output interface computer 110 processes a signal produced by depression of a key of the key-in device 111 and feeds the resulting signal to the agent computer 120. The voice input device 112 converts the user's voice instruction or speech inputted thereto to corresponding voice speech data, and feeds it to the input/output interface computer 110, recognizes the contents of the voice speech data on the basis of a voice recognition program stored in the storage device 115, analyzes the classification and meaning of the contents of a request for information retrieval from the recognized voice speech data in accordance with a meaning analysis program stored in the storage device 115, and feeds the result of the analysis to the agent computer block 120.

When the input/output interface computer block 101 receives information on candidates retrieved in the information retrieval process executed by the agent computer block 102 for the analyzed classification and meaning of the contents of the request for retrial fed to the agent computer block 102, it converts the information on candidates to voice data in accordance with a voice conversion program stored in the storage device 115, and outputs the information as the voice data from the voice output device 113.

The key-in device 111 is composed of character input keys, mode keys, numeral (0–9) keys, function keys, etc., to select a menu and enter various data by depressing corresponding keys to feed relevant signals to the input/output interface computer 110.

The voice input device 112 A/D-converts the user's voice instruction or speech inputted via a built-in microphone and feeds the resulting digital voice signal to the input/output interface computer 110.

Usually, it is determined depending on the type of input data which of the key-in device 111 and the voice input device 112 should be used whereas the voice input device 112 is used to input data on a request for information retrieval by the user.

The voice output device 113 D/A-converts the voice data as a digital signal received from the input/output interface computer block 110 and outputs a corresponding voice from a speaker built therein.

The display device 114 is composed of a CRT or a liquid crystal display unit which displays data received from the input/output interface computer 110 and also displays a voice instruction/retrieval information entered in a respective process which the agent computer 120 performs in response to a request for information retrieval.

The storage device 115 contains/stores the voice recognition program, meaning analysis program, and voice conversion program executed by the input/output interface computer 110 in the voice message input/output process, various dictionaries used in the meaning analysis process, and data.

The agent computer block 102 retrieves data on the contents of an inputted request for advice on the user's action in accordance with the agent's basic program stored in the storage device 122. More specifically, the agent computer block 102 recognizes the contents of a request for advice on the user's action from the result of the analysis of voice recognition character data inputted by the input/output interface computer 110, and sends the host personal computer 20 via the communication network 40 extraction conditions based on the contents of the request for advice on the user's action, information on the current time, information on the user's current position and narrow-down conditions deduced from the user's past selected situations and an instruction for retrieval information. The agent computer block 102 then selects and collects information in its own information data base or an information data base of the information service center 30 on the basis of the extraction conditions and instruction received by the host computer 20, narrows the selected/collected information down in accordance with the narrow-down conditions, and reads the narrowed-down information via the communication network 40 and communication interface 123. The agent computer block 102 creates candidate information from the read information and feeds the created information to the input/output interface computer 110.

The clock 121 has a clocking function which ticks away, for example, due to crystal oscillation and feeds information on the current time to the agent computer 120.

The storage device 122 includes a storage medium 122a which is composed of a magnetic or optical recording medium or a semiconductor memory provided fixedly or removably therein which contains/stores the agent's basic program, various corresponding application programs such as request content and word analysis programs, a select information file for storing data on the past information selection, and an owner information file which stores various owner data, for example, on the owner's preference items and schedules.

Arrangement may be such that the program/data contained/stored in the storage medium 122a are received from other devices via the public line communication network 40 and the communication interface 123. Alternatively, such program/data maybe gotten via a communication line from a storage medium 122a provided on another device containing/storing programs/data.

The communication interface 123 interfaces between the portable information terminal 100 and the communication network 40 (actually, the base station 50a). The communication interface 123 sends a signal such as a request for information retrieval from the agent computer to a nearby base station 50a in the form of radio waves based on a communication protocol of a respective communication type such as a PHS or portable telephone type. The communication interface 123 receives a signal, for example, indicative of a result of the information retrieval from the host computer 20 or the information service center 30, via the communication network 40 from the base station 50a in the form of radio waves based on a communication protocol of a respective communication type, and feeds the result of the receipt to the agent computer 120.

The communication interface 124 interfaces between a GPS 60, for example, mounted on a mobile object such as a car and the portable information terminal 100. The agent computer 120 sends the GPS 60 via the communication interface 124 a signal requesting the GPS 60 to send the terminal 100 information on its current position, receives information on the current position of the terminal 100 sent from the GPS 60 to the portable information terminal 100 in response to the requesting signal, and feeds the information to the agent computer 120. This communication is executed in the form of infrared communication or radio communication.

An information retrieving process as the operation of the third embodiment will be next described which is performed by the portable information terminal 100 and the host personal computer 20 when the information processing system 200 retrieves information which meets a request for advice on the user's (or owner's) action in response to an input user's instruction.

Figure 10:
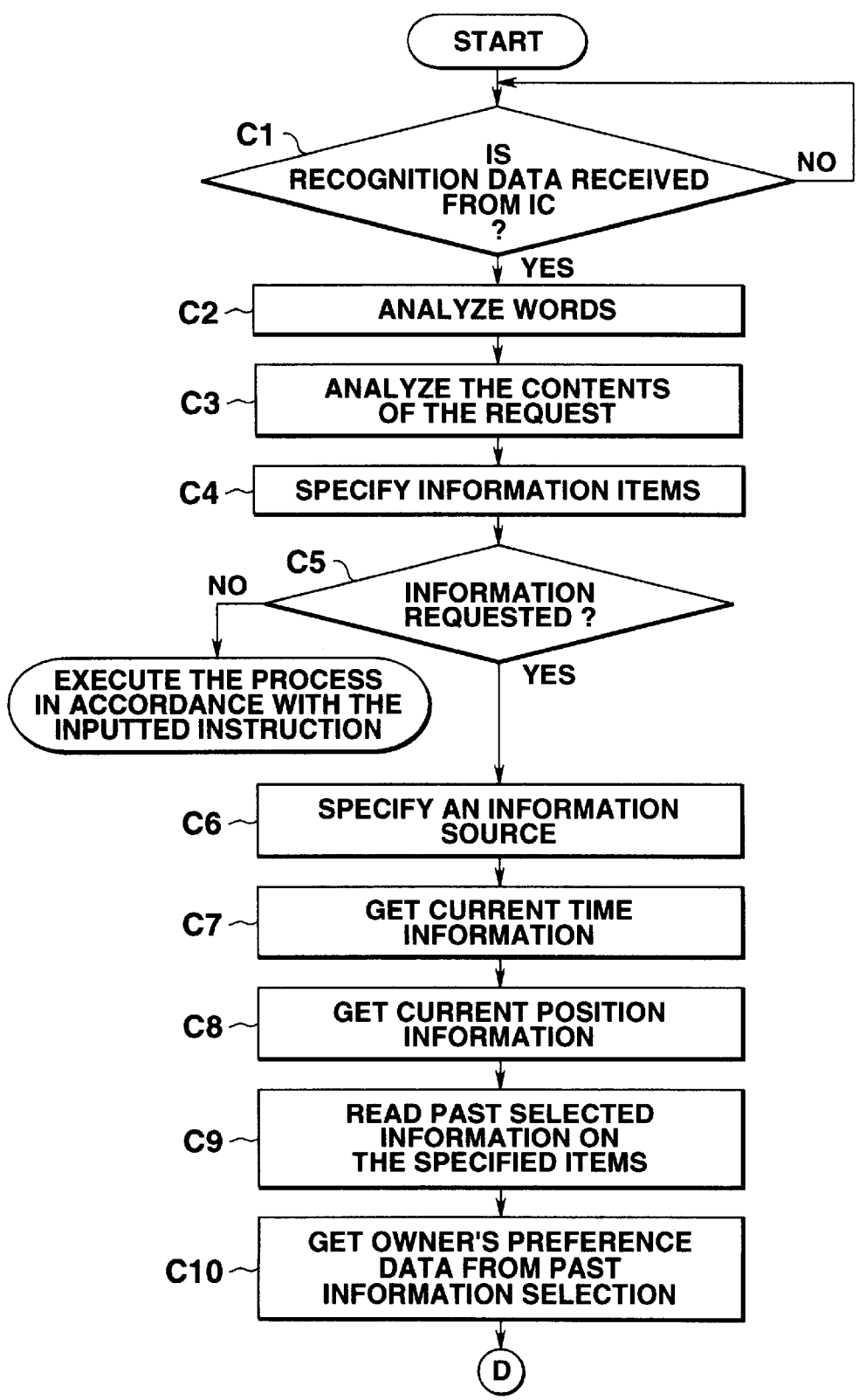
FIG. 10 is a flow chart of an information retrieval process executed by an agent computer of the information terminal.
Figure 11:
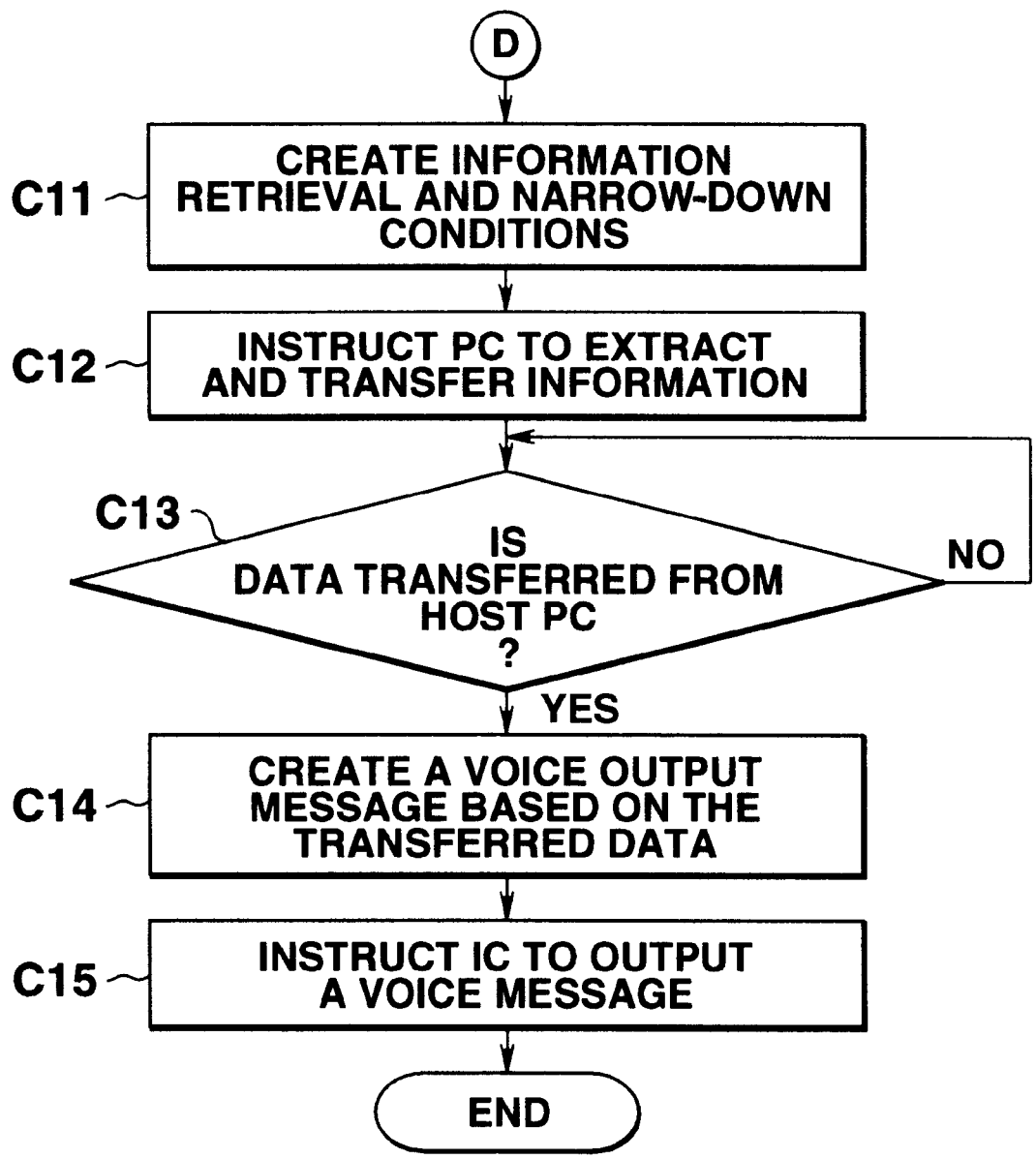
FIG. 11 is a flow chart to be combined with that of FIG. 10.

FIGS. 10 and 11 are combined to show a single flow chart of the information retrieving process performed by the agent computer 120 of the portable information terminal 100. First, at step C1, the agent computer 120 determines whether there is any voice recognition character data based on a voice instruction inputted by the input/output interface computer 110. More particularly, the agent computer 120 determines whether the input/output interface computer 110 has recognized the user's voice instruction inputted from the voice input device 112, has converted the voice instruction into voice recognition character data, and has inputted this data to the agent computer 120. If so, the agent computer 120 shifts its processing to step C2, and if not, again performs processing at step C1.

At step C2, the agent computer 120 separates the voice recognition character data inputted as a character string from the input/output interface computer 110 into word units, analyzes the meaning of each word, and then shifts its processing to step C3, where the agent computer 120 analyzes the contents of the request from the respective words analyzed at step C2.

The agent computer 120 then shifts its processing to step C4, where the agent computer 120 specifies a classification of the information required by the input voice instruction or message on the basis of the result of the analysis.

The agent computer 120 then shifts its processing to step C5, where the agent computer 120 determines from the result of the analysis of the input instruction at step C3 whether the user has requested any information. If so, the agent computer 120 shifts its processing to step C6. If not, the agent computer 120 performs a process conforming to the voice instruction inputted at step C1.

At step C6, the agent computer 120 specifies an information data base from which information should be collected, and requests the specified information data base to retrieve the required information.

The agent computer 120 then shifts its processing to step C7, where the agent computer 120 gets information on the current time from the clock 121.

The agent computer 120 then shifts its processing to step C8, where the agent computer 120 gets information on the current position from the GPS device 60.

The agent computer 120 then shifts its processing to step C9, where the agent computer 120 reads information on specified ones of the user's past selected information stored in the storage device.

The agent computer 120 then shifts its processing to step C10, where the agent computer recognizes the user's past information selection from the selected information read at step C9, and gets the owner's or user's preference data about the information selection (narrow-down conditions).

The agent computer 120 then shifts its processing to step C11, where it creates information extraction conditions (information classification, current time, the user's current position) and narrow-down conditions (preference data based on the user's past selected information) from the above various data gotten by the user.

At step C12, the agent computer 120 gives the host personal computer 20 an information extraction instruction based on the information extraction conditions and an instruction to transfer the information extracted by the information extraction instruction.

The agent computer 120 then shifts its processing to step C13, where it determines whether there is any extracted information transferred by the host personal computer 20 at step C12. If so, the agent computer 120 shifts its processing to step C14, and if not, again performs the process at step C13.

At step C14, the agent computer 120 assembles the data read into the storage device, and creates a sentence as an output message.

The agent computer 120 then shifts its processing to step C15, where it instructs the input/output interface computer 110 to output the created sentence as a voice message signal to thereby cause the voice output device 113 to output a corresponding voice message. Thus, the control process performed by the agent computer 120 is terminated.

More specifically, the above flow will be described, using an example. When, for example, the user or owner inputs to the voice input device 112 a voice message or request "I'd like to go to a concert from now. Will you tell me a concert which is now being given somewhere? Do you have any information about it?", the input/output interface computer 110 converts the inputted voice message to voice recognition character data, which is then inputted to the agent computer 120 (step C1). The agent computer 120 pays attention to words of the voice recognition character data, such as "from now", "concert", "I'd like to go", "somewhere", and "information", analyzes those words, and recognizes that "information" is requested, that the information relates to the "concert", and that the "information" relates to a concert which is given at a place which the owner or user can visit even from now in time for its opening" (steps C2, C3). The agent computer 120 specifies items of information to be retrieved on the basis of the analyzed contents of the request and determines a classification of a data base to be accessed (step C4, C5). In this case, it is determined that the items of information to be determined relate to a concert, and that the data base to be accessed relates to "concert information". The agent computer 120 then determines that the determined "data base related to concert information" is not stored in the host computer 20, and recognizes that it is required to access the information service center 30, which contains an information data base on the concert information, via the communication network (step C6).

The agent computer 120 then recognizes that it is necessary to get information on the current time and the owner's current position from the "information on a concert which is given in a place which the user can visit in time for its opening even from now" obtained as the result of the analysis of the user's inputted voice message or instruction, gets information on the current time from the clock 121 (step C7), and also gets information on the owner's current position, for example, that "The user is at Tachikawa Station" from the GPS 60 (step C8).

Then, the agent computer 120 reads, from the select information file, "past selected information data" corresponding to "concert information" of the specified category (step C9), recognizes the past situation of selection, for example, "Classic concert information was selected in many cases, especially Mozart's melodies were selected overwhelmingly many times" from the past selection of the user's "concert information", and gets the user's "preference data" from the situation of selection (step C10). That is, the agent computer 120 gets the preference data "The user's favorite music is a classic one and especially, his or her favorite composer is Mozart".

The agent computer 120 then creates the conditions of extracting information from the result of the analysis and the various gotten data (step C11). The extracting conditions relate to information on concerts as a classification of information; the opening times of the concerts for which the owner can visit in time even from now as the time; places near Tachikawa Station as the places for the concerts, and user's preference items based on the user's past selected information as the narrow-down conditions (in this case, the narrow down conditions are classic music as the type of music, and Mozart as the composer).

An instruction to access the information service center 30 which has an information data base related to the specified classification of information, an instruction to extract information conforming to the information extraction conditions to the information service center and an instruction to transfer only the result of the extraction are given from the agent computer 120 to the host personal computer 20 in the owner's home (step C12).

At this time, the host personal computer 20 connects via the communication network 40 to the information service center 30, requests the information service center 30 to extract information based on the information extraction instruction and down load all the results of the extraction, and then cuts the connection line, in accordance with the instructions from the agent computer 120. The host personal computer 20 narrows the extracted information down in accordance with the narrow-down conditions, and transfers the resulting extracted data to the agent computer 120.

When the agent computer 120 receives the extracted data from the host personal computer 20 (step C13), it creates message data based on the received extracted data (step C14), and instructs the input/output interface computer 110 to output the message audibly (step C15). As a result, the voice output device 113 provides the user with a voice message, for example, "A concert of Mozart is going to be given near here. The place is a XXX Hall which is a five-minute walk from Kunitachi Station. The concert will be opened at 06:00 p.m. You can arrive in ample time for the concert even from now."

Figure 12:
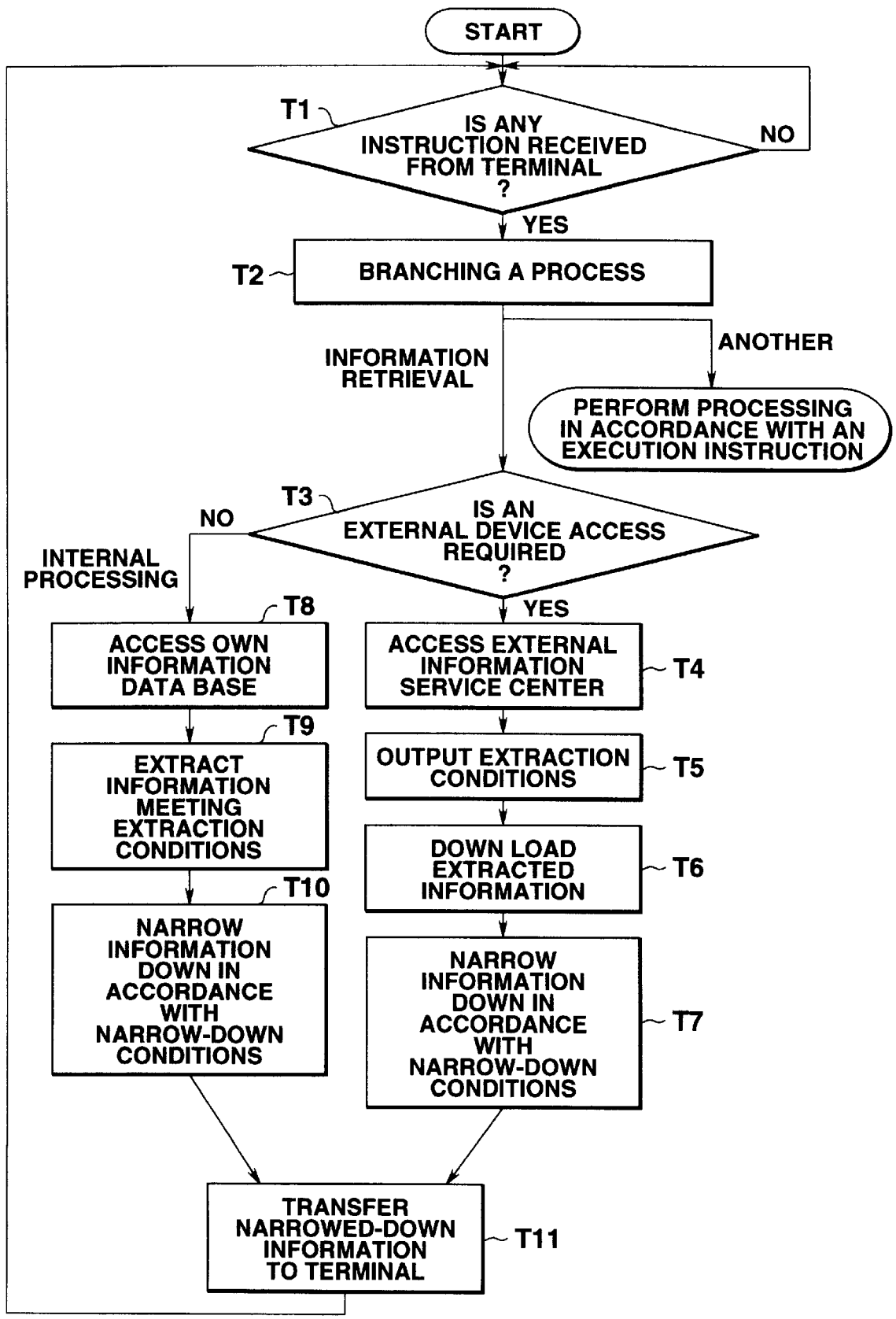
FIG. 12 is a flow chart of an information retrieval process executed by a host personal computer.

Various data processes performed by the host personal computer 20 in the information retrieval process will be described next with respect to a flow chart of FIG. 12.

First, at step T1, the host personal computer 20 determines whether there is any instruction from the portable information terminal 100. If so, the host personal computer 20 shifts its processing to step T2. If not, the host personal computer 20 again performs processing at step T1.

At step T2, the host personal computer 20 performs a branching process depending on the contents of an execution instruction received from the portable information terminal 100. In this case, if the command is for information retrieval, the host personal computer 20 shifts its processing to step T3, and if the command is for another one, performs a corresponding process.

At step T3, the host personal computer 20 determines whether an external device should be accessed to execute the information retrieval instruction (that is, whether the information to be retrieved is in the information data base of the host personal computer 20). If so, the host personal computer 20 shifts its processing to step T4, and if not, shifts its processing to step T8.

At step T4, the host personal computer 20 accesses the external information service center 30 suitable for the classification of information to be retrieved via the communication network 40.

The host personal computer 20 then shifts its processing to step T5, where the host personal computer 20 feeds the conditions of extracting information excluding the narrow-down conditions to the accessed information service center 30.

The host personal computer 20 then shifts its processing to step T6, where it stores data down loaded from the external information service center 30 into the storage device.

The host personal computer 20 then shifts its processing to step T7, where it extracts only data which meets the narrow-down conditions from the data down-loaded and stored in the storage device, and then shifts its processing to step T11.

The host personal computer 20 then shifts its processing to step T8, where when it determines that the external device is not required to be accessed to execute the information retrieval command at step T3 (that is, when the information to be retrieved is determined to be in the information data base of the host personal computer 20), the host personal computer 20 accesses its own information data base.

The host personal computer 20 then shifts its processing to step T9, where it extracts information which meets the extraction conditions excluding the narrow-down conditions from the information data base of the host personal computer 20.

The host personal computer 20 then shifts its processing to step T10, where it narrows down the extracted information in accordance with the narrow-down conditions.

The host personal computer 20 then shifts its processing to step T11, where it transfers the narrowed-down information to the portable information terminal 100, and then returns its processing to step T1. Thus, the information retrieval process performed by the host personal computer 20 is terminated.

In summary, in the third embodiment, when information required for advice on the user's action is read from an external information data base by connecting the portable information terminal 100 to the communication network 40, extraction conditions such as the classification of information, the current time, the user's current position and the conditions of narrowing down extracted information, to be specified from the words which the user entered, and an instruction to extract the information are sent to the host personal computer 20. By those operations, the portable information terminal 100 causes the host personal computer 20 to access its own information data base or the information service center 30 which has an information data base suitable for the classification of information to be retrieved to thereby cause the host personal computer 20 to read the information which meets the extraction conditions. The portable information terminal 100 further causes the host personal computer 20 to narrow the read information down, and then causes the host personal computer 20 to transfer the resulting narrowed-down information to the portable information terminal 100. As a result, without requiring any special operations, the user gets information necessary for owner's actions.

I claim:

1. An information processor responsive to a request for advice on an individual's action for retrieving information which meets the content of the request and for providing the information for the individual, comprising:

input means for inputting the contents of the request to the information processor;

extraction item setting means in which a plurality of extraction items corresponding to the content of the request is set;

preference information storing means in which the individual's preference information is stored;

keyword specifying means for analyzing the content of the request inputted by said input means, and for specifying a keyword corresponding to any one of the plurality of extraction items set in said extraction item setting means on the basis of the result of the analysis;

item extracting means for extracting at least one of the extraction items set in said extraction item setting means in consideration of the individual's preference information stored in said preference information storing means on the basis of the keyword specified by said keyword specifying means; and information retrieving means for retrieving from a predetermined data base information which meets the inputted content of the request for advice on the individual's action on the basis of the at least one of the extraction items extracted by said extracting means.

2. The information processor according to claim 1, wherein said item extracting means extracts at least one of the extraction items set in said extraction item setting means on the basis of the keyword specified by said keyword specifying means, extracts at least one of the extraction items on the basis of the keyword and the individual's preference information stored in said preference information storage means, and stores the respective results of the extraction; and said information retrieving means retrieves from a predetermined data base information which meets the inputted contents of the request for advice on the user's action in accordance with the at least one extraction item extracted on the basis of the keyword and the preference information from the results of the extraction by said item extracting means and outputs the retrieved information preferentially.

3. An information processor responsive to a request for advice on an individual's action for retrieving information which meets the contents of the request and for providing the information for the individual, comprising:

input means for inputting the contents of the request to the information processor;

classification setting means in which a plurality of classifications each corresponding to the contents of a request for advice on the individual's action is set;

program storage means in which a plurality of application programs each for a respective one of the classifications is stored;

analyzing means for analyzing the contents of the request for advice on the individual's action inputted by said input means;

start-up means for determining on the basis of the result of the analysis which of the classifications set in said classification setting means the contents of the request for advice on the individual's action corresponds to and for starting up an application program stored in said program storage means and corresponding to the appropriate classification.

4. An information processor, connected to an external data processor having an information data base, for requesting, in response to an individuals request for advice on the individual's action, the data processor to retrieve information which meets the content of the individual's request, and for providing the information retrieved by the data processor for the individual, comprising:

input means for inputting the content of the individual's request to the information processor;

analyzing means for analyzing the inputted contents of the individual's request;

process requesting means for requesting the external data processor to retrieve information which meets the individual's request on the basis of the result of the analysis; and output means for providing the individual with the information retrieved by the data processor depending on the contents of the request by said process requesting means.

5. The information processor according to claim 4, further comprising inherent information storage means which contains information inherent in the individual and wherein said process requesting means requests, in consideration of the inherent information contained in said inherent information storage, the data processor to retrieve information which meets the individual's request on the basis of the result of the analysis of the inputted content of the individual's request.

6. An information processor responsive to a request for advice on an individual's action for retrieving information which meets the contents of the request and for providing the information for the individual, comprising:

input means for inputting the contents of the request to the information processor;

action information storage means in which records of the individual's past actions are stored;

extraction item setting means in which a plurality of extraction items for the contents of the request for advice on the individual's action is set;

analysis means for analyzing the contents of the request inputted by said input means; and extraction means for extracting the tendency of the individual's actions in consideration of records of the individual's past actions stored in said action information storage means when at least one of the extraction items set in said extraction item setting means is extracted from of the result of the analysis, for narrowing the extraction items down on the basis of the tendency of the individual's actions and the result of the analysis, and for outputting the narrowed-down extraction items.

7. A storage medium comprising:

a first computer-executable program code for analyzing the contents of an inputted request for advice on an individual's action and for specifying on the basis of the result of the analysis a keyword corresponding to at least one of a set plurality of extraction items;

a second computer-executable program code for extracting any one of the set extraction items on the basis of the specified keyword in consideration of the individual's preference information; and a third computer-executable program code for retrieving from a predetermined information data base information which meets the contents of the inputted request for advice on the individual's action on the basis of the extracted extraction item.

8. A storage medium comprising:

a first computer-executable program code for analyzing the contents of an inputted request for advice on an individual's action; and a second computer-executable program code for determining on the basis of the result of the analysis which of classifications each set in correspondence to the contents of a request for advice on the individual's action the inputted request comes under, and for starting up an application program stored in said program storage means and corresponding to the classification of the contents of a request which the inputted request comes under.

9. A storage medium comprising:

a first computer-executable program code for analyzing the contents of an inputted request for advice on an individual's action; and a second computer-executable program code for requesting an external center having an information data base to retrieve information which meets the request for advice on the user's action on the basis of the analysis; and a third computer-executable program code for outputting the information retrieved by the external center in response to the request for information retrieval by said second computer executable program code.

10. A storage medium comprising:

a first computer-executable program code for analyzing the contents of an inputted request for advice on an individual's action; and a second computer-executable program for extracting the tendency of the individual's actions in consideration of stored records of the individual's past actions when a plurality of set extraction items is extracted from the result of the analysis, for narrowing the extraction items down on the basis of the tendency of the individual's actions and the result of the analysis, and for outputting the narrowed-down extraction items.

11. A portable information terminal having a communication function to communicate via a communication network with an external device having an information data base, comprising:

input means for inputting to the portable information terminal the contents of a request for advice on an individual's action when the portable information terminal is requested to retrieve information necessary for the contents of the request for advice on the individual's action;

analysis means for analyzing the contents of the request for advice on the individual's action inputted by said input means;

specifying means for specifying a classification of information which meets the contents of the request for advice on the individual's action on the basis of the result of the analysis of the contents of the request for advice on the individual's action by said analysis means;

output means for accessing an external device having an information data base suitable for the classification of information specified by said specifying means to provide for the external device extraction conditions and an extraction instruction to extract information which meets the contents of the request for advice on the individual's action; and read means for reading the information extracted from the information data base of the external device on the basis of the extraction conditions and extraction instruction provided by said output means.

12. The portable information terminal according to 11, further comprising clocking means for recording the current time and wherein said output means provides for the external device the classification of information specified by said specifying means or the current time recorded by said clocking means as the conditions for extracting information which meets the contents of the request for advice on the individual's action.

13. The portable information terminal according to 11, further comprising current position detecting means for detecting the current position of the terminal and wherein said output means provides for the external device the classification of information specified by said specifying means or the current position of the terminal detected by said current position detecting means as the conditions for extracting information which meets the contents of the request for advice on the individual's action.

14. The portable information terminal according to 11 further comprising recognition means for reading data on the selection of information corresponding to the classification of information specified by said specifying means from a data base which contains data on the past situation of information selection stored in a storage device of the portable information terminal and for recognizing the situation of the selection of the read information; and drawing-out means for drawing out the conditions for narrowing required information down from the situation of selection of the information recognized by said recognition means;

said output means providing for the external device the classification of information specified by said specifying means or the conditions for narrowing down information drawn out by said drawing-out means as conditions of extracting information which meets the contents of the request for advice on the individual's action.

15. The portable information terminal according to 11 further comprising:

current position detection means for detecting the current position of the terminal;

recognition means for reading data on the selection of information corresponding to the classification of information specified by said specifying means from a data base which contains data on the past situation of information selection stored in a storage device of the portable information terminal and for recognizing the situation of the selection of the read information; and drawing-out means for drawing out the conditions for narrowing required information down from the situation of selection of the information recognized by said recognition means;

said output means providing for the external device the classification of information specified by said specifying means, the current position detected by said current position of the terminal detection means or the conditions for narrowing down information drawn out by said drawing-out means as the conditions for extracting information which meets the contents of the request for advice on the individual's action.

16. A portable terminal having a communication function to communicate via a communication network with an external device having an information data base, an information processor, which is provided at a position remote from the terminal, being connected to the communication network, the terminal comprising:

input means for inputting to the portable information terminal the contents of a request for retrieving information necessary for the contents of a request for advice on an individual's action when the portable information terminal is requested to retrieve the necessary infomation;

analysis means for analyzing the contents of the request for retrieving the necessary information inputted by said input means;

specifying means for specifying a classification of information which meets the contents of the request for advice on the individual's action on the basis of the result of the analysis by said analysis means;

output means for accessing the information processor to provide for the information processor extraction conditions and an extraction instruction to extract information necessary for the contents of the request for advice on the individual's action;

instruction means for instructing the information process or to extract information from an information data base of the information processor or an information data base of an external device for the classification of information specified by said specifying means, in accordance with the extraction conditions and extraction instruction provided by said output means and to transfer the extracted information to the terminal; and read means for reading the information transferred by the information processor in accordance with the instruction by said instructing means.

17. The portable information terminal according to 16, further comprising clocking means for recording the current time and wherein said output means provides for the information processor the classification of information specified by said specifying means or the current time recorded by said clocking means as the conditions for extracting information.

18. The portable information terminal according to 17, further comprising current position detecting means for detecting the current position of the terminal and wherein said output means provides for the information processor the classification of information specified by said specifying means or the current position of the terminal detected by said current position detecting means as the conditions for extracting information.

19. A storage medium containing:

a first computer-executable program code for inputting to a portable information terminal the contents of a request for advice on an individual's action when the portable information terminal is requested to retrieve information necessary for the contents of the request for advice on the individual's action;

a second computer-executable program code for analyzing the contents of the inputted request for advice on the individual's action;

a third computer executable-program code for specifying on the basis of the result of analyzing the contents of the inputted request a classification of information which meets the contents of the request for advice on the individual's action;

a fourth computer-executable program code for accessing an external device having an information data base suitable for the classification of information to be specified to provide for the external device extraction conditions and an extraction instruction to extract information necessary for the contents of the request for advice on the individual's action; and a fifth computer executable-program code for reading the information extracted from the information data base of the external device in accordance with the provided extraction conditions and extraction instruction.

20. A storage medium containing:

a first computer executable program code for inputting to a portable information terminal a request for retrieving information necessary for the contents of a request for advice on an individual's action when the portable information terminal is requested to retrieve the necessary information;

a second computer-executable program code for analyzing the contents of the inputted request for retrieving the necessary information;

a third computer executable-program code for specifying on the basis of the result of analyzing the contents of the request for retrieving the necessary information a classification of information which meets the contents of the request for advice on the individual's action;

a fourth computer-executable program code for accessing an information processor to provide for the information processor extraction conditions and an extraction instruction to extract information necessary for the contents of the request for advice on the individual's action;

a fifth computer-executable program code for instructing the information process to extract information from an information data base of the information processor or an information data base of an external device, suitable for the classification of information to be specified, on the basis of the provided extraction items and extraction instruction and for transferring the extracted information to the terminal; and a sixth computer executable-program code for reading the extracted information transferred by the information processor in accordance with the instruction from the portable information terminal.

* * * * *

UNITED STATES PATENT AND TRADEMARK OFFICE
CERTIFICATE OF CORRECTION

PATENT NO. : 6,026,400
DATED : February 15, 2000
INVENTOR(S) : Hideo SUZUKI

It is certified that error appears in the above-indentified patent and that said Letters Patent is hereby corrected as shown below:

Column 24, line 47 (claim 12, line 1), after "to"
       insert --claim--,
    line 56 (claim 13, line 1), after "to"
       insert --claim--,
    line 66 (claim 14, line 1), after "to"
       insert --claim--;

Column 25, line 18 (claim 15, line 1), after "to"
       insert --claim--;

Column 26, line 10 (claim 17, line 1), after "to"
       insert --claim--,
    line 18 (claim 18, line 1), after "to"
       insert --claim--.

Signed and Sealed this

Fifteenth Day of May, 2001

Attest:

NICHOLAS P. GODICI

*Attesting Officer*    *Acting Director of the United States Patent and Trademark Office*